US012578831B1

(12) United States Patent
Huang et al.

(10) Patent No.: US 12,578,831 B1
(45) Date of Patent: Mar. 17, 2026

(54) TOUCH MODULE WITH DIFFERENT TYPES OF PRESSURE SENSING ELEMENTS

(71) Applicant: Primax Electronics Ltd., Taipei (TW)

(72) Inventors: Wei-Chiang Huang, Taipei (TW);
Wei-Ping Chan, Taipei (TW);
Chieh-Hung Hsieh, Taipei (TW);
Tse-Ping Kuan, Taipei (TW);
Ming-Hui Yeh, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 19/016,683

(22) Filed: Jan. 10, 2025

(30) Foreign Application Priority Data

Dec. 4, 2024 (TW) ................................. 113146969

(51) Int. Cl.
*G06F 3/044* (2006.01)

(52) U.S. Cl.
CPC .................................. *G06F 3/0447* (2019.05)

(58) Field of Classification Search
CPC .................................................... G06F 3/0447
See application file for complete search history.

(56) References Cited

U.S. PATENT DOCUMENTS

| | | | |
|---|---|---|---|
| 2015/0205395 A1* | 7/2015 | Lin ..................... | G06F 3/03547 |
| | | | 345/173 |
| 2016/0273986 A1* | 9/2016 | Neubarth .............. | G01L 9/0073 |
| 2018/0239433 A1* | 8/2018 | Akabane ................ | G06F 3/045 |
| 2022/0137766 A1* | 5/2022 | Hsu ..................... | G06F 3/03547 |
| | | | 345/173 |
| 2023/0333656 A1* | 10/2023 | Liu ......................... | G01L 1/122 |

* cited by examiner

*Primary Examiner* — Afroza Chowdhury
(74) *Attorney, Agent, or Firm* — KIRTON McCONKIE; Evan R. Witt

(57) ABSTRACT

A touch module includes a base plate, a touch pad, a first pressure sensing element, a second pressure sensing element and a controller. The touch pad includes a first touch area, a second touch area and a third touch area. The first pressure sensing element and the second pressure sensing element are arranged between the base plate and the touch pad. When the first touch pressure area is pressed, the first pressure sensing element generates a first signal, and the controller generates a pressure signal according to the first signal. When the second touch pressure area, the second pressure sensing element generates a second signal, and the controller generates the pressure signal according to the second signal. When the third touch pressure area is pressed, the controller generates the pressure signal according to a result of comparing signal intensities of the first signal and the second signal.

15 Claims, 7 Drawing Sheets

TOUCH MODULE WITH DIFFERENT TYPES OF PRESSURE SENSING ELEMENTS

FIELD OF THE INVENTION

The present invention relates to a touch-sensitive input device, and more particularly to a touch module.

BACKGROUND OF THE INVENTION

A conventional touch module with the pressure sensing function is equipped with one or more pressure sensors. Generally, each pressure sensor inside the touch module has a limited sensing area. In addition, different pressure sensors have different weight sensing ranges. Due to the characteristics of these pressure sensors, some areas of the touch plane on the touch module cannot be covered by the sensitive area of the pressure sensors, or the pressure weight that is too light or too heavy cannot be sensed by the pressure sensors. In other words, some areas may lose their pressure sensing function or become insensitive. Moreover, the sizes of touch modules on the market are usually different. Due to the differences between the installation positions of the pressure sensors in the touch modules, errors in the sensing areas are usually generated. Furthermore, since there are many complex components and circuits inside the touch module, it is also a difficult problem to install the pressure sensors between these complex components and circuits, reduce the interference from other structures, and avoid damage of the pressure sensors during operation.

SUMMARY OF THE INVENTION

For solving the drawbacks of the conventional technologies, the present invention provides a touch module. The touch module of the present invention includes two types of pressure sensing elements. The two different types of pressure sensing elements provide different sensing areas, and the weight sensing ranges for sensing the magnitudes of pressing forces are also different. The two types of pressure sensing elements are respectively arranged in different areas inside the touch module. Consequently, one type of pressure sensing element can sense the area or corner that the other type of pressure sensing element cannot sense. The sensing areas of the two types of pressure sensing elements are overlapped with each other. In addition, the overlap sensing area of the sensing areas corresponds to the area that is usually touched by the user. Due to the cooperation of the two types of pressure sensing elements, the upper limit and the lower limit of the weight sensing range are increased, the plane coverage of the sensing area is maximized, and the precision of weight measurement is improved. Consequently, the sensing blind spot of using the single type of sensing element will be eliminated, and the pressure sensing sensitivity will be improved. Furthermore, the installation positions of the pressure sensing elements are determined according to the size and the structure of the touch module. Consequently, the overall module structure becomes lighter and thinner, and the service life of the pressure sensing elements will be extended.

In accordance with an aspect of the present invention, a touch module is provided. The touch module includes a base plate, a touch pad, a first pressure sensing element, a second pressure sensing element and a controller. The base plate has a surface. The touch pad includes a circuit layer and a touch layer. The base plate is covered by the touch pad. The circuit layer faces the surface of the base plate. The touch layer is electrically connected with the circuit layer. The touch layer includes a first touch area, a second touch area and a third touch area. The first pressure sensing element is arranged between the base plate and the touch pad. The first pressure sensing element has a first sensing area, and the pressure sensing element is aligned with the first touch area of the touch layer. The second pressure sensing element is arranged between the base plate and the touch pad and separated from the first pressure sensing element. The second pressure sensing element has a second sensing area. The pressure sensing element is aligned with the second touch f area of the touch layer. The controller is electrically connected with the first pressure sensing element and the second pressure sensing element, and the controller generates a pressure signal. When the first touch area of the touch layer is pressed, the first pressure sensing element generates a first signal, and the controller generates the pressure signal according to the first signal. When the second touch area of the touch layer is pressed, the second pressure sensing element generates a second signal, and the controller generates the pressure signal according to the second signal. When the third touch area of the touch layer is pressed, the first pressure sensing element generates the first signal, and the second pressure sensing element generates the second signal. When the controller receives both of the first signal and the second signal, the controller generates the pressure signal according to a result of comparing signal intensities of the first signal and the second signal.

In an embodiment, the touch layer further includes a plane center and an outer edge. The first touch area of the touch layer is aligned with the plane center of the touch layer. The second touch area of the touch layer is aligned with the outer edge of the touch layer. The third touch area of the touch layer is arranged between the first touch area and the second touch area.

In an embodiment, the first pressure sensing element is located at a position corresponding to the plane center of the touch layer, and the second pressure sensing element is located at a position corresponding to the outer edge of the touch layer.

In an embodiment, the first sensing area of the first pressure sensing element is extended from the plane center of the touch layer toward the outer edge of the touch layer, and the second sensing area of the second pressure sensing element is extended from the outer edge of the touch layer toward the plane center of the touch layer.

In an embodiment, the first sensing area of the first pressure sensing element and the second sensing area of the second pressure sensing element are overlapped with each other, so that an overlap sensing area between the first sensing area and the second sensing area is defined. The overlap sensing area is aligned with the third touch area of the touch layer.

In an embodiment, when the controller receives both of the first signal and the second signal, the controller compares the signal intensities of the first signal and the second signal, and the controller generates the pressure signal according to the one of the first signal and the second signal with the stronger signal intensity.

In an embodiment, the first pressure sensing element and the second pressure sensing element are installed on the circuit layer of the touch pad and electrically connected with the circuit layer.

In an embodiment, the first pressure sensing element senses a deformation of the touch pad and generates the first signal according to an amount of the deformation, and the second pressure sensing element senses a change of a distance between the touch pad and the base plate and generates the second signal according to the change of the distance.

In an embodiment, the second pressure sensing element includes a plurality of pressure sensors, and sensing areas of the plurality of pressure sensors are collaboratively formed as the second sensing area.

In an embodiment, the base plate includes a plurality of supporting structures, and the plurality of supporting structures are formed on the surface of the base plate and located beside the plurality of pressure sensors of the second pressure sensing element. Each of the supporting structures includes an elastic arm and a separation part, and the separation part is disposed on the corresponding elastic arm.

In an embodiment, the plurality of pressure sensors are separated from each other, and each supporting structure is arranged between two adjacent pressure sensors of the plurality of pressure sensors.

In an embodiment, the base plate includes a plurality of raised structures, and the plurality of raised structures are formed on the surface of the base plate and aligned with the plurality of pressure sensors. Each of the raised structures is aligned with one corresponding pressure sensor.

In an embodiment, the touch module further includes a vibration element, and the vibration element is arranged between the base plate and the touch pad and aligned with the second touch area of the touch layer. The vibration element is electrically connected with the controller. The vibration element includes a coil and a magnet.

In an embodiment, the coil of the vibration element is installed on the circuit layer of the touch pad and located beside the second pressure sensing element, and the coil of the vibration element is installed on the surface of the base plate. When the coil is energized, the coil is induced by the magnet to generate vibration.

In an embodiment, a weight sensing range of the first pressure sensing element is in a range between 5 grams and 500 grams, and a weight sensing range of the second pressure sensing element is in a range between 50 grams and 150 grams.

In an embodiment, the first pressure sensing element is a microelectromechanical systems (MEMS) pressure sensor, and the pressure sensor of the second pressure sensing element is a capacitive pressure sensor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
FIG. 1 is a schematic perspective view of a touch module according to an embodiment of the present invention.
Figure 2:
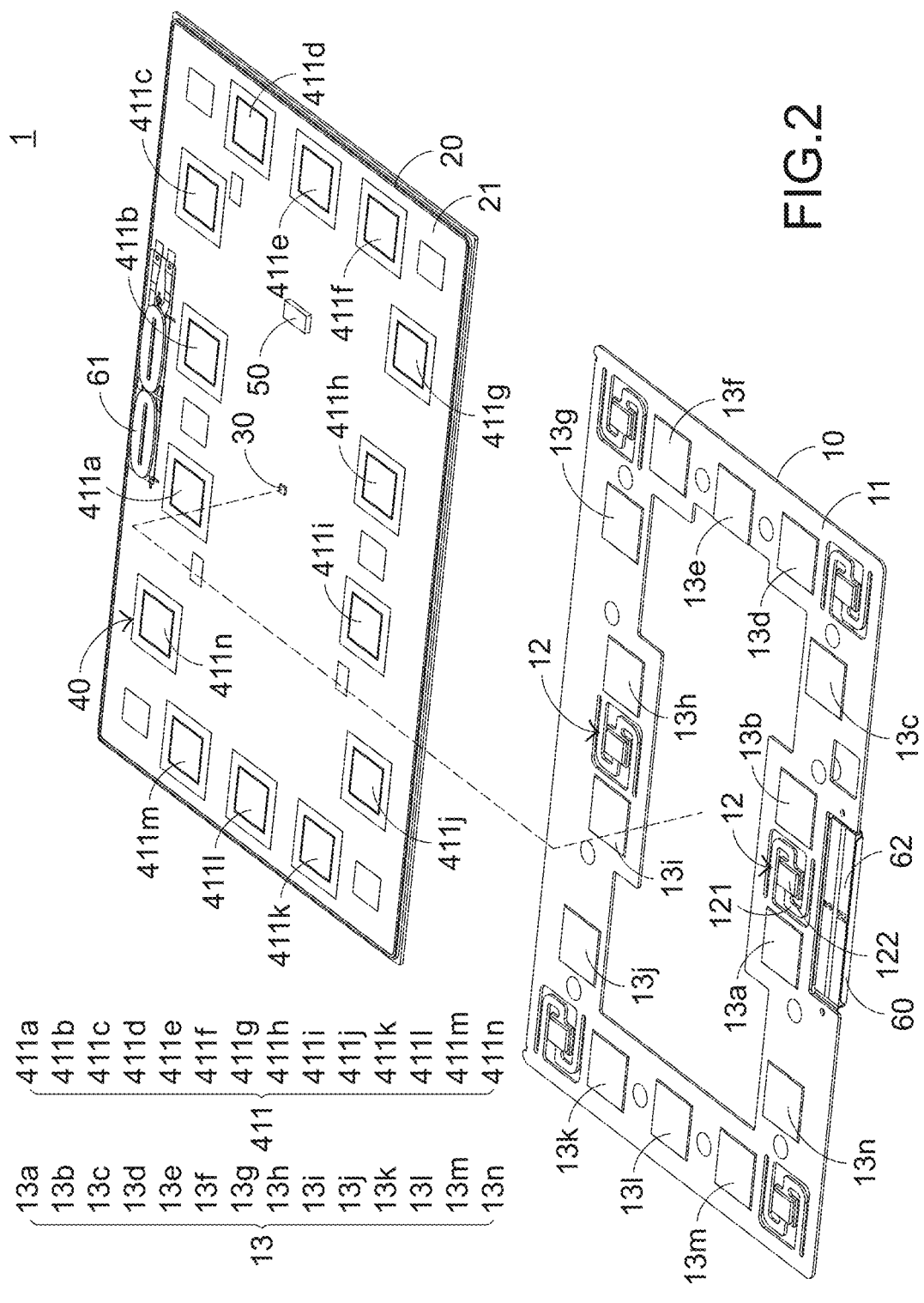
FIG. 2 is a schematic exploded view of the touch module according to the embodiment of the present invention.
Figure 3:
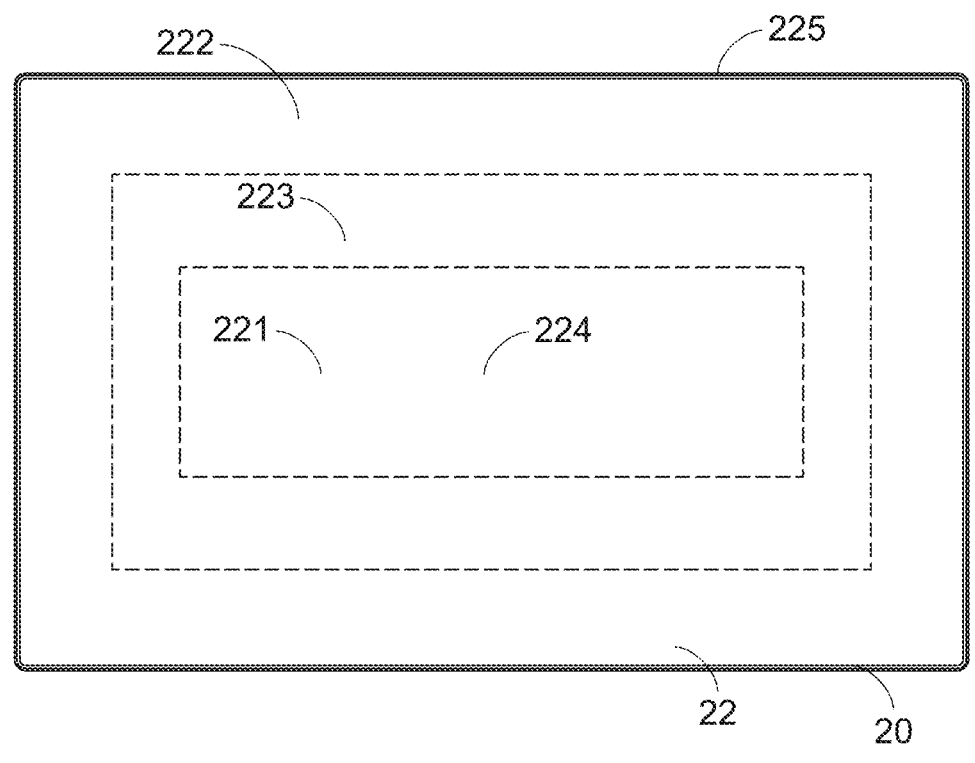
FIG. 3 schematically illustrates the touch area in the touch pad of the touch module according to the embodiment of the present invention.
Figure 4:
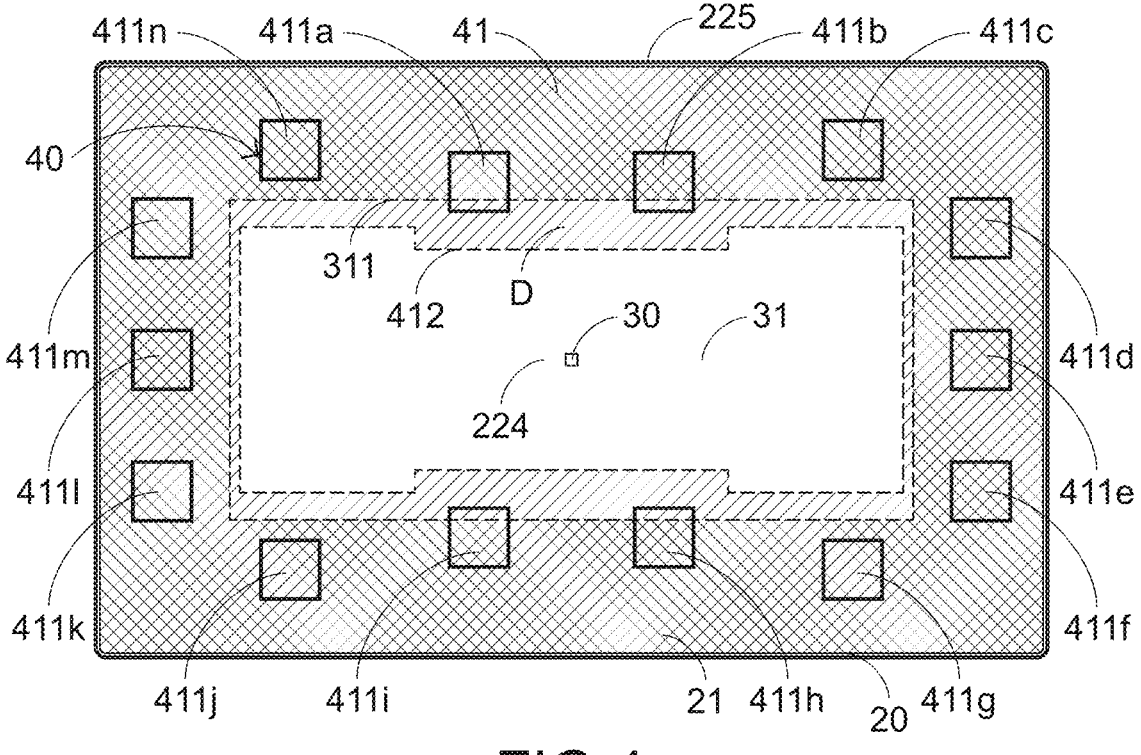
FIG. 4 schematically illustrates the sensing area of the pressure sensing element on the touch pad according to the embodiment of the present invention.

FIG. 1 is a schematic perspective view of a touch module according to an embodiment of the present invention. FIG. 2 is a schematic exploded view of the touch module according to the embodiment of the present invention. FIG. 3 schematically illustrates the touch area in the touch pad of the touch module according to the embodiment of the present invention. FIG. 4 schematically illustrates the sensing area of the pressure sensing element of the touch module according to the embodiment of the present invention.

In an embodiment, the touch module 1 includes a base plate 10, a touch pad 20, a first pressure sensing element 30, a second pressure sensing element 40, a controller 50 and a vibration element 60.

The base plate 10 has a surface 11. The touch pad 20 includes a circuit layer 21 and a touch layer 22. The touch layer 22 includes a first touch area 221, a second touch area 222, a third touch area 223, a plane center 224 and an outer edge 225. The first pressure sensing element 30 has a first sensing area 31. The first pressure sensing element 30 can generate a first signal 301. The second pressure sensing element 40 has a second sensing area 41. The second pressure sensing element 40 can generate a second signal 401. The controller 50 is used to generate a pressure signal P. The first signal 301, the second signal 401 and the pressure signal P will be described later in FIGS. 8A, 8B and 8C. The vibration element 60 is used to generate vibration, and thus the touch module 1 has a vibration feedback function.

The base plate 10 and the touch pad 20 are in parallel with each other. The base plate 10 is covered by the touch pad 20. The circuit layer 21 of the touch pad 20 faces the surface 11 of the base plate 10. The touch layer 22 of the touch pad 20 is opposed to the circuit layer 21. In addition, the touch layer 22 is electrically connected with the circuit layer 21. The first pressure sensing element 30 is arranged between the base plate 10 and the touch pad 20. In addition, the first pressure sensing element 30 is electrically connected with the circuit layer 21 of the touch pad 20. Preferably, the first pressure sensing element 30 is disposed on the circuit layer 21 of the touch pad 20. The first sensing area 31 of the first pressure sensing element 30 is aligned with the first touch area 221 of the touch layer 22. The second pressure sensing element 40 is arranged between the base plate 10 and the touch pad 20 and separated from the first pressure sensing element 30. The second pressure sensing element 40 is electrically connected with the circuit layer 21 of the touch pad 20. Preferably, the second pressure sensing element 40 is disposed within the circuit layer 21 of the touch pad 20. The second sensing area 41 of the second pressure sensing element 40 is aligned with the second touch area 222 of the touch layer 22. The controller 50 is electrically connected with the first pressure sensing element 30 and the second pressure sensing element 40. Preferably, the controller 50 is disposed on the circuit layer 21 of the touch pad 20. The vibration element 60 is arranged between the base plate 10 and the touch pad 20 and electrically connected to the controller 50.

When the first touch area 221 of the touch layer 22 is pressed by the user, the first pressure sensing element 30 generates a first signal 301. According to the first signal 301 the controller 50 generates a pressure signal P. When the second touch area 222 of the touch layer 22 is pressed by the user, the second pressure sensing element 40 generates a second signal 401. According to the second signal 401, the controller 50 generates the pressure signal P. When the third touch area 223 of the touch layer 22 is pressed by the user, the first pressure sensing element 30 generates the first signal 301, and the second pressure sensing element 40 generates the second signal 401. Meanwhile, the controller 50 receives the first signal 301 and the second signal 401 simultaneously. According to the result of comparing the signal intensities of the first signal 301 and the second signal 401, the controller 50 generates the pressure signal P.

In an embodiment, a plurality of supporting structures 12 and a plurality of raised structures 13 are formed on the base plate 10. Each supporting structure 12 includes an elastic arm 121 and a separation part 122. Each separation part 122 is disposed on a corresponding elastic arm 121. As mentioned above, the touch layer 22 of the touch pad 20 further includes the plane center 224 and the outer edge 225. The vibration element 60 includes a coil 61 and a magnet 62. In this embodiment, the touch module is equipped with a single first pressure sensing element 30. It is noted that the number of the first pressure sensing element 30 is not restricted. In some other embodiments, the touch module is equipped with a plurality of first pressure sensing elements. The second pressure sensing element 40 includes a plurality of pressure sensors 411. The plurality of pressure sensors 411 are separated from each other. The sensing areas of the plurality of pressure sensors 411 are overlapped with each other. These sensing areas are collaboratively formed as the second sensing area 41. In this embodiment, the plurality of pressure sensors 411 of the second pressure sensing element 40 include pressure sensors 411a, 411b, 411c, 411d, 411e, 411f, 411g, 411h, 411i, 411j, 411k, 411l, 411m and 411n, and the plurality of raised structures 13 on the base plate 10 include raised structures 13a, 13b, 13c, 13d, 13e, 13f, 13g, 13h, 13i, 13j, 13k, 13l, 13$_m$ and 13n.

When the touch pad 20 is pressed down, the touch pad 20 is subjected to a deformation, and the distance between the touch pad 20 and the base plate 10 is subjected to a change.

The first pressure sensing element 30 senses the deformation of the touch pad 20 and generates the first signal 301 according to the amount of the deformation. The second pressure sensing element 40 senses the change of the distance between the touch pad 20 and the base plate 10 and generates the second signal 401 according to the distance change. The first pressure sensing element 30 has a wide sensing area. However, the structure of the first pressure sensing element 30 is relatively precise, and the first pressure sensing element 30 is easily interfered with other elements. Therefore, the first pressure sensing element 30 needs to be separated from other elements by a long distance. The second pressure sensing element 40 has a narrow sensing area. However, since the second pressure sensing element 40 is not easily interfered with other elements, the sensing sensitivity and the service life of the second pressure sensing element 40 will not be adversely affected. Therefore, the second pressure sensing element 40 can be arranged near other elements. The first pressure sensing element 30 can sense the pressing force in a larger weight sensing range. For example, the optimal weight sensing range of the first pressure sensing element 30 is related to the pressing force weight of 5 grams to 500 grams. The second pressure sensing element 40 can sense the pressing force in a smaller weight sensing range. For example, the weight sensing range of the second pressure sensing element 40 is related to the pressing force weight of 50 grams to 150 grams.

Preferably but not exclusively, the first pressure sensing element 30 is a microelectromechanical systems (MEMS) pressure sensor, and the pressure sensor of the second pressure sensing element 40 is a capacitive pressure sensor.

The plurality of supporting structures 12 and the plurality of raised structures 13 of the base plate 10 are disposed on the surface 11 of the base plate 10. The plurality of raised structures 13 are aligned with the plurality of pressure sensors 411 of the second pressure sensing element 40. The plurality of raised structures 13 are respectively aligned with the corresponding pressure sensors 411. That is, each raised structure 13 is aligned with one pressure sensor 411. As shown in FIG. 2, the raised structure 13a is aligned with the pressure sensor 411a, and the raised structure 13b is aligned with the pressure sensor 411b. The rest may be deduced by analogy.

The plurality of supporting structures 12 of the base plate 10 are respectively located beside the plurality of pressure sensors 411 of the second pressure sensing element 40. The elastic arms 121 of the supporting structures 12 are integrally formed with the base plate 10. The touch pad 20 and the base plate 10 are separated from each other by a specified through the separation parts 122 on the elastic arms 121. As shown in FIG. 2, each supporting structure 12 is arranged between two adjacent pressure sensors 411. Due to this arrangement, each supporting structure 12 can be used to support two adjacent pressure sensors 411. Consequently, the adjacent pressure sensors 411 and the corresponding raised structures 13 on the base plate 10 are separated from each other.

As mentioned above, the vibration element 60 includes the coil 61 and the magnet 62. The vibration element 60 is arranged between the base plate 10 and the touch pad 20. In addition, the vibration element 60 is aligned with the second touch area 222 of the touch layer 22. The coil 61 of the vibration element 60 is installed on the circuit layer 21 of the touch pad 20. The coil 61 of the vibration element 60 is located beside the second pressure sensing element 40. The magnet 62 of the vibration element 60 is disposed on the surface 11 of the base plate 10. In addition, the coil 61 is aligned with the magnet 62. When the coil 61 is energized, the coil 62 is induced by the magnet 62 to generate vibration. Since the vibration element 60 is located beside the second pressure sensing element 40, the pressure sensing efficacy will not be adversely affected, and the possibility of causing damage of the pressure sensors will be minimized.

Figure 5:
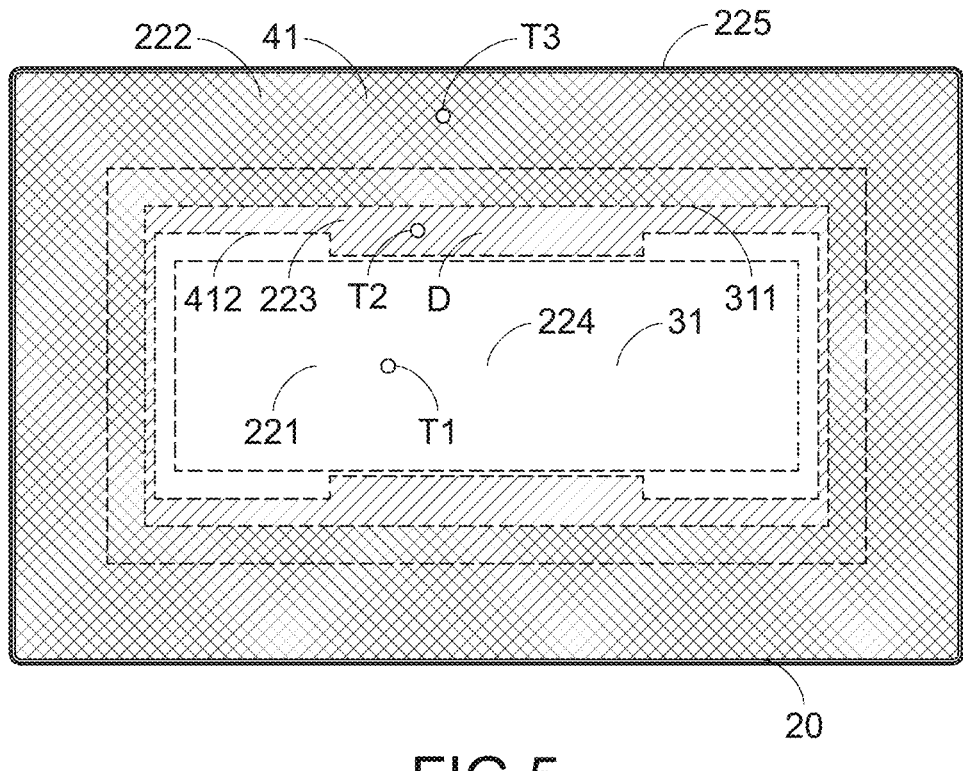
FIG. 5 schematically illustrates the touch area and the sensing area of the touch pad according to the embodiment of the present invention.
Figure 6A:
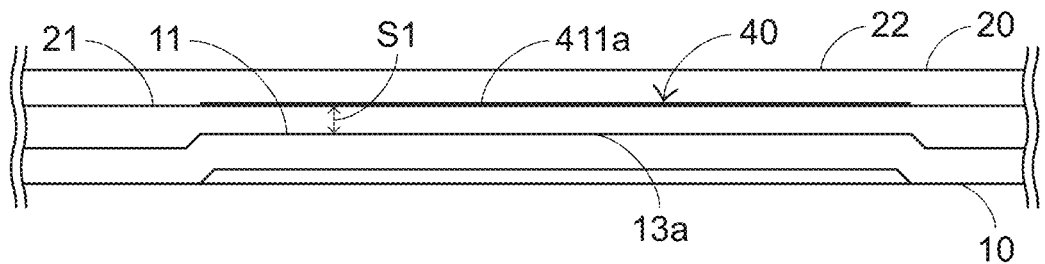
FIG. 6A is a schematic cross-sectional view illustrating the second pressure sensing element of touch module according to the embodiment of the present invention, in which the touch pad is not pressed.
Figure 6B:
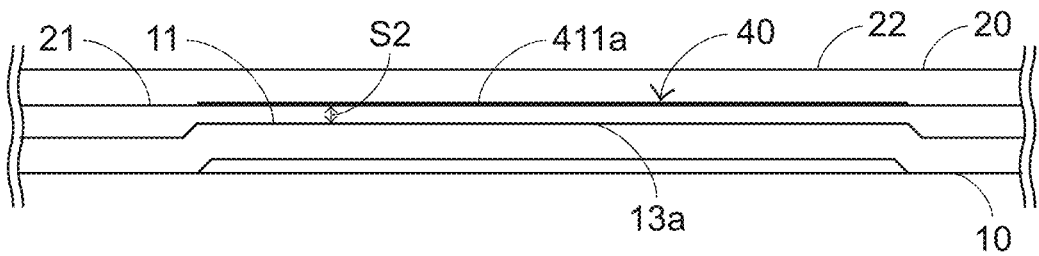
FIG. 6B is a schematic cross-sectional view illustrating the second pressure sensing element of touch module according to the embodiment of the present invention, in which the touch pad is pressed.
Figure 7A:
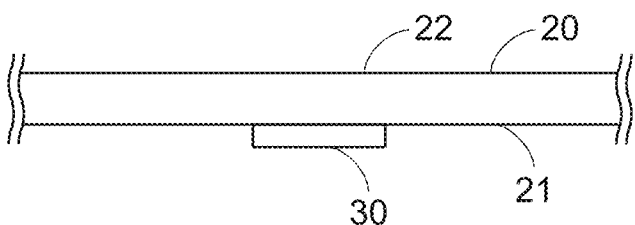
FIG. 7A is a schematic cross-sectional view illustrating the first pressure sensing element of touch module according to the embodiment of the present invention, in which the touch pad is not pressed.
Figure 7B:
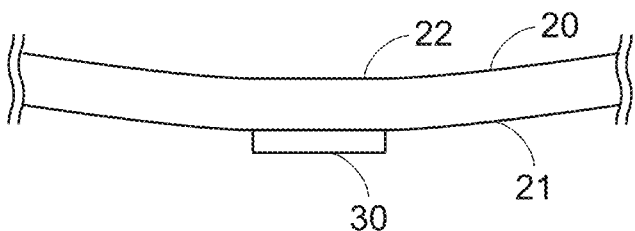
FIG. 7B is a schematic cross-sectional view illustrating the first pressure sensing element of touch module according to the embodiment of the present invention, in which the touch pad is pressed.
Figures 8A, 8B:
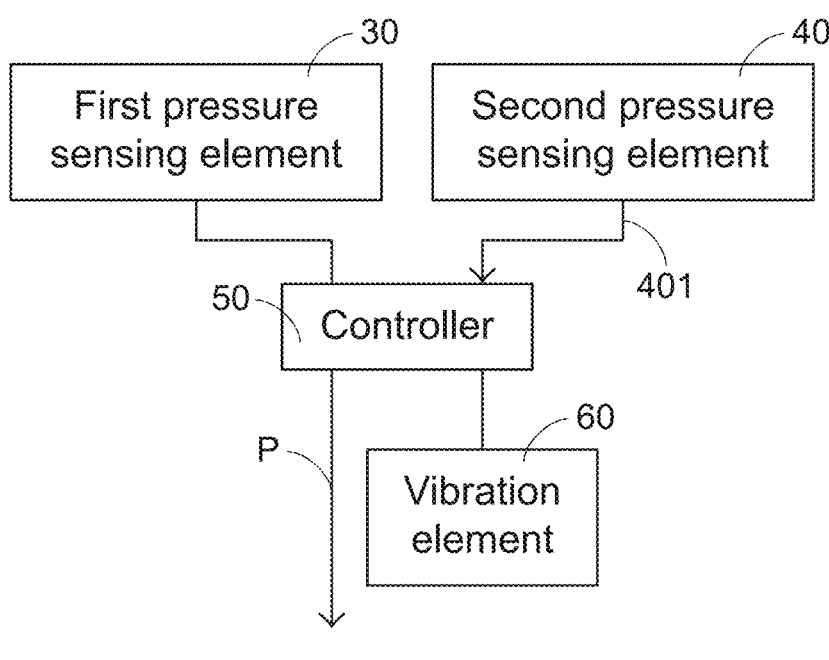
FIG. 8A is a schematic block diagram illustrating the signal processing method for the touch module according to the embodiment of the present invention, in which the second signal is generated.
FIG. 8B is a schematic block diagram illustrating the signal processing method for the touch module according to the embodiment of the present invention, in which the first signal is generated.
Figure 8C:
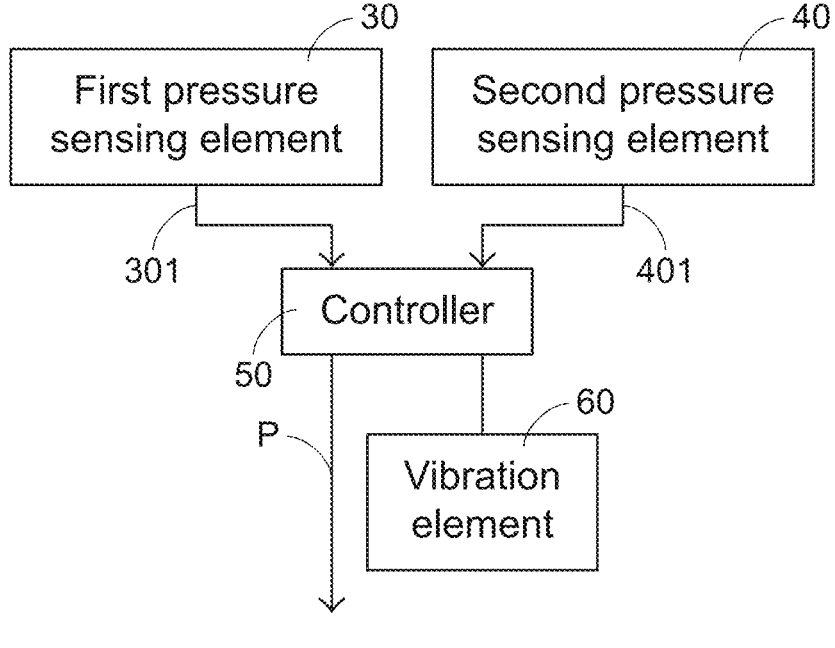
FIG. 8C is a schematic block diagram illustrating the signal processing method for the touch module according to the embodiment of the present invention, in which the first signal and the second signal are both generated.

The pressure sensing process and the signal processing method for the touch module will be described as follows. FIG. 4 schematically illustrates the sensing area of the pressure sensing element on the touch pad according to the embodiment of the present invention. FIG. 5 schematically illustrates the touch area and the sensing area of the touch pad according to the embodiment of the present invention. FIG. 6A is a schematic cross-sectional view illustrating the second pressure sensing element of touch module according to the embodiment of the present invention, in which the touch pad is not pressed. FIG. 6B is a schematic cross-sectional view illustrating the second pressure sensing element of touch module according to the embodiment of the present invention, in which the touch pad is pressed. FIG. 7A is a schematic cross-sectional view illustrating the first pressure sensing element of touch module according to the embodiment of the present invention, in which the touch pad is not pressed. FIG. 7B is a schematic cross-sectional view illustrating the first pressure sensing element of touch module according to the embodiment of the present invention, in which the touch pad is pressed. FIG. 8A is a schematic block diagram illustrating the signal processing method for the touch module according to the embodiment of the present invention, in which the second signal is generated. FIG. 8B is a schematic block diagram illustrating the signal processing method for the touch module according to the embodiment of the present invention, in which the first signal is generated. FIG. 8C is a schematic block diagram illustrating the signal processing method for the touch module according to the embodiment of the present invention, in which the first signal and the second signal are both generated.

Please refer to FIG. 3 again. In the touch layer 22 of the touch pad 20, the first touch area 221 is aligned with the plane center 224 of the touch layer 22, the second touch area 222 is aligned with the outer edge 225 of the touch layer 22, and the third touch area 223 of the touch layer 22 is arranged between the first touch area 221 and the second touch area 222.

Please refer to FIG. 4 again. The first pressure sensing element 30 is located at a position corresponding to the plane center 224 of the touch layer 22. The second pressure sensing element 40 is located at a position corresponding to the outer edge 225 of the touch layer 22, and the plurality of pressure sensors 411a-411n of the second pressure sensing element 40 are installed on the positions corresponding to the outer edge 225 of the touch layer 22. The first sensing area 31 of the first pressure sensing element 30 is extended from the plane center 224 of the touch layer 22 toward the outer edge 225 of the touch layer 22. Due to the sensing area limitation, a first sensing area boundary 311 is the maximum boundary that the first sensing area 31 of the first pressure sensing element 30 can sense and cover. The second sensing area 41 of the second pressure sensing element 40 is extended from the outer edge 225 of the touch layer 22 toward the plane center 224 of the touch layer 22. Due to the sensing area limitation, a second sensing area boundary 412 is the maximum boundary that the second sensing area 41 of the second pressure sensing element 40 can sense and cover. The area that the first sensing area 31 cannot cover is covered by the second sensing area 41. Similarly, the area that the second sensing area 41 cannot cover is covered by the first sensing area 31.

As mentioned above, the first pressure sensing element 30 is located at the position of the first touch area 221 of the touch layer 22 that is usually pressed by the user. Since the optimal weight sensing range of the first pressure sensing element 30 is related to the pressing force in the range between 5 grams and 500 grams, the pressure sensing element 30 can sense the user's pressing action and pressing weight more precisely. The second pressure sensing element 40 is located at the position of the second touch area 222 of the touch layer 22 that is not usually used and not easily pressed by the user. Since the optimal weight sensing range of the second pressure sensing element 40 is related to the pressing force in the range between 50 grams and 150 grams, the second pressure sensing element 40 can only sense the larger pressing force applied by the user. In addition, since the second pressure sensing element 40 cannot sense excessive pressing force, the sensing misjudgment caused by the accidental touch of the user or the influence of other heavy object pressure will be avoided.

The first sensing area 31 of the first pressure sensing element 30 and the second sensing area 41 of the second pressure sensing element 40 are overlapped with each other. Consequently, an overlap sensing area D between the first sensing area 31 and the second sensing area 41 is defined. The overlap sensing area D is aligned with the third touch area 223 of the touch layer 22. The third touch area 223 is the area that is the most easily pressed when the touch pad 20 is in use. Since the two pressure sensing elements are operable in the overlap sensing area D, the sensing precision and the sensing lift will be enhanced. If one of the two pressure sensing elements is damaged, the other pressure sensing element can provide support. Furthermore, since the first pressure sensing element 30 and the second pressure sensing element 40 are both operable in the third touch area 223, weight sensing range is also related to the pressing force in the range between 5 grams and 500 grams. Consequently, the lighter pressing force or the heavier pressing force of the user can be sensed.

Please refer to FIG. 5, FIG. 6A, FIG. 6B, FIG. 7A, FIG. 7B, FIG. 8A, FIG. 8B and FIG. 8C.

In FIG. 5, the touch areas of the touch pad 20 and the sensing areas of the pressure sensing elements are shown. There are three different touch positions on the touch pad 20. These touch positions are not generated at the same time. That is, these touch positions are pressed by the user at different time points. These three touch positions include a first touch position T1, a second touch position T2, and a third touch position T3.

The sensing method and the signal processing method for the second pressure sensing element 40 will be illustrated with reference to FIG. 6A, FIG. 6B and FIG. 8A. In FIG. 6A, the touch pad 20 is in an unpressed state. Under this circumstance, a first distance S1 is maintained between the pressure sensor 411a of the second pressure sensing element 40 on the touch pad 20 and the raised structure 13a of the base plate 10. In FIG. 6B, the touch pad 20 is in a pressed state. When the third touch position T3 on the touch pad 20 is pressed by the user, the touch pad 20 is moved toward the base plate 10 in response to the user's pressing force. Since the third touch position T3 is located in the second touch area 222 and included in the second sensing area 41, the distance between the pressure sensor 411a near the touch position T3 and the corresponding raised structure 13a of the base plate 10 is subjected to the change. The distance is changed from first distance S1 to the second distance S2. As shown in FIG. 8A, the second pressure sensing element 40 senses the distance change and generates the second signal 401. According to the second signal 401, the controller 50 generates a pressure signal P, and the controller 50 controls the vibration element 60 to generate vibration.

The sensing method and the signal processing method for the first pressure sensing element 30 will be illustrated with reference to FIG. 7A, FIG. 7B and FIG. 8A. In FIG. 7A, the touch pad 20 is in the unpressed state, and the touch pad 20 is not subjected to the deformation. Meanwhile, no signal is generated by first pressure sensing element 30 on the touch panel 20. In FIG. 7B, the touch pad 20 is in the pressed state. When the first touch position T1 on the touch pad 20 is pressed by the user, the touch pad 20 is subjected to tiny curvy deformation in response to the pressing force because the touch position T1 is located in the first touch area 221 and included in the first sensing area 31. The first pressure sensing element 30 senses the deformation of the touch pad 20 and generates the first signal 301 according to the deformation amount. As shown in FIG. 8B, the controller 50 generates the pressure signal P according to the first signal 301. In addition, the controller 50 controls the vibration element 60 to generate vibration.

The sensing method and the signal processing method corresponding to the second touch position T2 will be illustrated as follows. As mentioned above, the second touch position T2 is located in the third touch area 223 and included in the overlap sensing area D between the first sensing area 31 and the second sensing area 41. When the pressing force is applied to the second touch position T2, the pressing force is sensed by the first pressure sensing element 30 and the second pressure sensing element 40. As mentioned above, the touch pad 20 is moved toward the base plate 10 in response to the pressing force, and the touch pad 20 is subjected to the tiny curvy deformation. Consequently, the second pressure sensing element 40 generates the second signal 401, and the first pressure sensing element 30 generates the first signal 301. As shown in FIG. 8C, the controller 50 receives both of the first signal 301 and the second signal 401. After comparing the signal intensities of the first signal 301 and the second signal 401, the controller 50 generates the pressure signal P according to the signal with the stronger signal intensity. In addition, the controller 50 controls the vibration element 60 to generate vibration.

From the above descriptions, the present invention provides the touch module. In the touch module, more than one type or preferably more than two types of pressure sensing elements are used to perform the pressure sensing operation on the touch areas of the same touch module. In accordance with the main technical concepts of the present invention, two pressure sensing functions corresponding to different plane sensing areas and different weight sensing ranges are integrated into the same touch area to achieve joint operation and mutual assistance. Consequently, the efficacy not achieved by one sensing element is supplemented by the other sensing element. Furthermore, a plurality of pressure sensing elements belonging to the same type can be located at different positions and combined in quantity to achieve the pressure sensing function of detecting different plane sensing areas and different weight sensing ranges. That is, numerous modifications or variations may be made while retaining the teachings of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:

a base plate having a surface;

a touch pad comprising a circuit layer and a touch layer, wherein the base plate is covered by the touch pad, the circuit layer faces the surface of the base plate, and the touch layer is electrically connected with the circuit layer, wherein the touch layer comprises a first touch area, a second touch area and a third touch area;

a first pressure sensing element arranged between the base plate and the touch pad, wherein the first pressure sensing element has a first sensing area, and the pressure sensing element is aligned with the first touch area of the touch layer;

a second pressure sensing element arranged between the base plate and the touch pad and separated from the first pressure sensing element, wherein the second pressure sensing element has a second sensing area, and the pressure sensing element is aligned with the second touch area of the touch layer; and a controller electrically connected with the first pressure sensing element and the second pressure sensing element, and generating a pressure signal, wherein when the first touch area of the touch layer is pressed, the first pressure sensing element generates a first signal, and the controller generates the pressure signal according to the first signal, wherein when the second touch area of the touch layer is pressed, the second pressure sensing element generates a second signal, and the controller generates the pressure signal according to the second signal, wherein when the third touch area of the touch layer is pressed, the first pressure sensing element generates the first signal, and the second pressure sensing element generates the second signal, wherein when the controller receives both of the first signal and the second signal, the controller generates the pressure signal according to a result of comparing signal intensities of the first signal and the second signal, wherein the touch layer further comprises a plane center and an outer edge, wherein the first touch area of the touch layer is aligned with the plane center of the touch layer, the second touch area of the touch layer is aligned with the outer edge of the touch layer, and the third touch area of the touch layer is arranged between the first touch area and the second touch area.

2. The touch module according to claim 1, wherein the first pressure sensing element is located at a position corresponding to the plane center of the touch layer, and the second pressure sensing element is located at a position corresponding to the outer edge of the touch layer.

3. The touch module according to claim 2, wherein the first sensing area of the first pressure sensing element is extended from the plane center of the touch layer toward the outer edge of the touch layer, and the second sensing area of the second pressure sensing element is extended from the outer edge of the touch layer toward the plane center of the touch layer.

4. The touch module according to claim 1, wherein the first sensing area of the first pressure sensing element and the second sensing area of the second pressure sensing element are overlapped with each other, so that an overlap sensing area between the first sensing area and the second sensing area is defined, wherein the overlap sensing area is aligned with the third touch area of the touch layer.

5. The touch module according to claim 1, wherein when the controller receives both of the first signal and the second signal, the controller compares the signal intensities of the first signal and the second signal, and the controller generates the pressure signal according to the one of the first signal and the second signal with the stronger signal intensity.

6. The touch module according to claim 1, wherein the first pressure sensing element and the second pressure sensing element are installed on the circuit layer of the touch pad and electrically connected with the circuit layer.

7. The touch module according to claim 1, wherein the first pressure sensing element senses a deformation of the touch pad and generates the first signal according to an amount of the deformation, and the second pressure sensing element senses a change of a distance between the touch pad and the base plate and generates the second signal according to the change of the distance.

8. The touch module according to claim 1, wherein the second pressure sensing element comprises a plurality of pressure sensors, and sensing areas of the plurality of pressure sensors are collaboratively formed as the second sensing area.

9. The touch module according to claim 8, wherein the base plate comprises a plurality of supporting structures, and the plurality of supporting structures are formed on the surface of the base plate and located beside the plurality of pressure sensors of the second pressure sensing element, wherein each of the supporting structures comprises an elastic arm and a separation part, and the separation part is disposed on the corresponding elastic arm.

10. The touch module according to claim 9, wherein the plurality of pressure sensors are separated from each other, and each supporting structure is arranged between two adjacent pressure sensors of the plurality of pressure sensors.

11. The touch module according to claim 1, wherein the base plate comprises a plurality of raised structures, and the plurality of raised structures are formed on the surface of the base plate and aligned with the plurality of pressure sensors, wherein each of the raised structures is aligned with one corresponding pressure sensor.

12. The touch module according to claim 1, wherein the touch module further comprises a vibration element, and the vibration element is arranged between the base plate and the touch pad and aligned with the second touch area of the touch layer, wherein the vibration element is electrically connected with the controller, and the vibration element comprises a coil and a magnet.

13. The touch module according to claim 12, wherein the coil of the vibration element is installed on the circuit layer of the touch pad and located beside the second pressure sensing element, and the coil of the vibration element is installed on the surface of the base plate, wherein when the coil is energized, the coil is induced by the magnet to generate vibration.

14. The touch module according to claim 1, wherein a weight sensing range of the first pressure sensing element is in a range between 5 grams and 500 grams, and a weight sensing range of the second pressure sensing element is in a range between 50 grams and 150 grams.

15. The touch module according to claim 1, wherein the first pressure sensing element is a microelectromechanical systems (MEMS) pressure sensor, and the pressure sensor of the second pressure sensing element is a capacitive pressure sensor.

* * * * *